Sept. 16, 1941.  C. C. FARMER  2,256,280
LOCOMOTIVE BRAKE CONTROL
Filed May 18, 1940
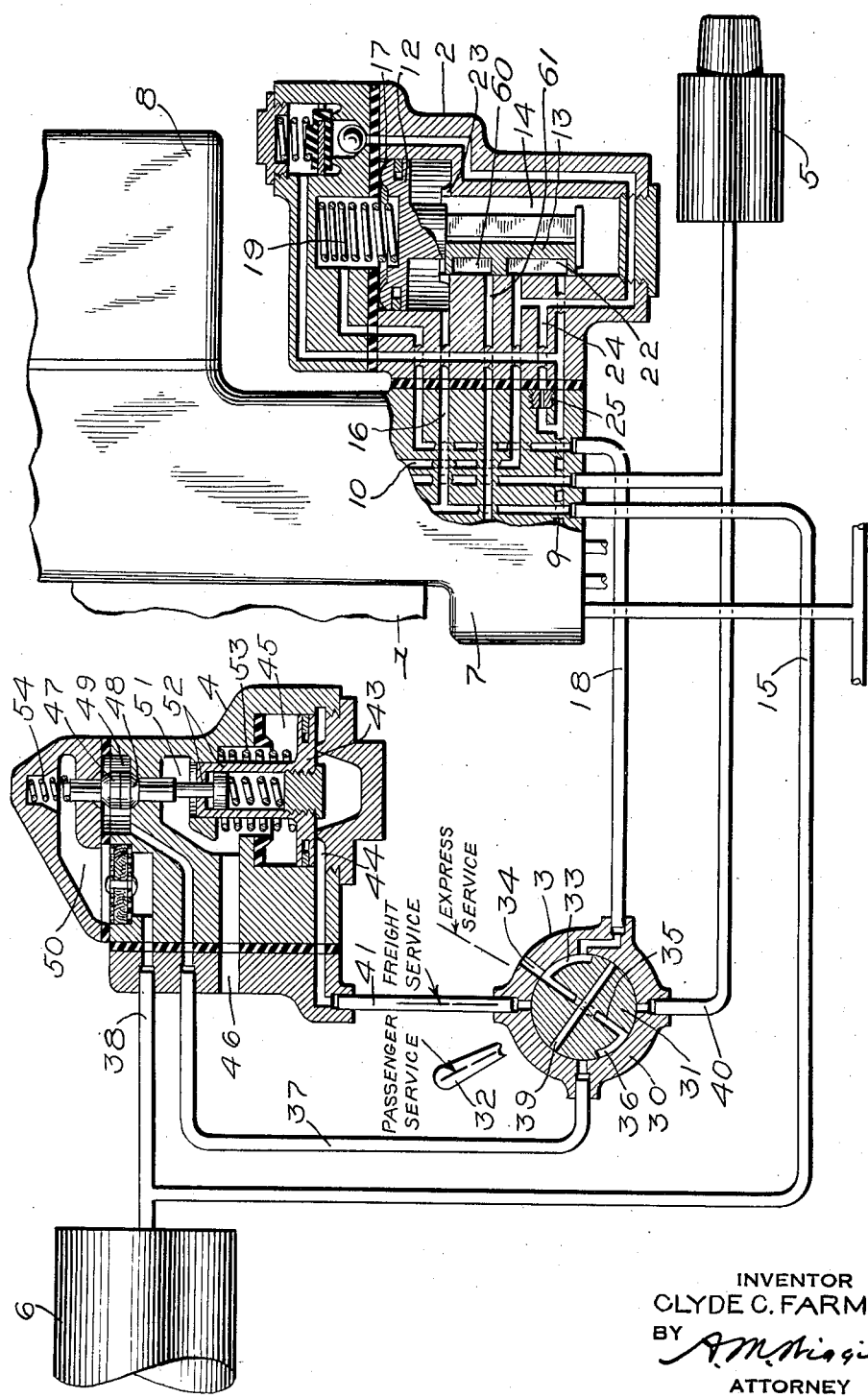
INVENTOR
CLYDE C. FARMER
BY A. M. Higgins
ATTORNEY Patented Sept. 16, 1941

2,256,280

UNITED STATES PATENT OFFICE 2,256,280

LOCOMOTIVE BRAKE CONTROL

Clyde C. Farmer, Pittsburgh, Pa., assignor to The Westinghouse Air Brake Company, Wilmerding, Pa., a corporation of Pennsylvania Application May 18, 1940, Serial No. 335,960

10 Claims. (Cl. 303—40)

This invention relates to fluid pressure brake equipment and more particularly to the type for use on railway locomotives.

In Patent 2,009,841, issued to Ellis E. Hewitt on July 30, 1935, and assigned to the assignee of the present application, there is disclosed a locomotive brake equipment which includes a distributing valve device having an application portion adapted to be operated by fluid under pressure to effect an application of locomotive brakes, and also having an equalizing portion adapted to respond to either a service or an emergency reduction in brake pipe pressure to supply fluid under pressure from a pressure chamber to the application portion for effecting operation thereof.

This brake equipment further embodies a delay valve device for controlling the rate at which fluid under pressure is supplied from the equalizing portion to the application portion in effecting an emergency application of the brakes. The delay valve device has a non-delay position to provide a relatively rapid rate of supply of fluid to the application portion and thereby a relatively rapid rate of application of the locomotive brakes, and a delay position for providing a slower rate of supply to the application portion and thus a relatively slow rate of brake application on the locomotive.

The delay position of the delay valve device is for use when the locomotive in hauling long freight trains and the purpose thereof is to so retard the rate of an emergency application of locomotive brakes with respect to the application of brakes on the cars in the train that the inertia of the locomotive will act to prevent the slack in the train running in at such a rate as is liable to cause damage to the cars in the train. In other words, by retarding the rate of brake application on the locomotive a gentle closing or gathering of slack in long freight trains will result and damage to the cars of the train will be avoided.

On passenger trains, which are relatively short as compared to freight trains, gathering of slack at the time an emergency application of brakes is effected is not a problem as in freight service, so that in passenger trains an emergency application of brakes on the locomotive may be effected at a faster rate than in freight trains, and to provide for such faster rate of application the non-delay position of the delay valve device is intended to be used so that a passenger train may be stopped in as short a distance as possible, as is desired in an emergency.

There is a third class of railway service, namely express service, in which the trains are usually shorter than freight trains but longer than passenger trains, and while the amount of slack in express trains is therefore not so great as in freight trains it is however greater than in passenger trains and is a governing factor in the rate at which an emergency application of brakes can be effected, because if such an application is effected at the rate provided for passenger service the gathering of the slack might result in damage to the cars in the train. It is however unnecessary to hold back an emergency application of brakes on the locomotive of express trains to the same extent as in freight service. In other words, in express trains the application of locomotive brakes should be retarded only for a sufficient period of time to assure gentle gathering of the slack in the train and then the rate may be increased to a desired maximum such as employed in passenger service for obtaining as quick an emergency stop of the train as possible.

One object of the present invention is to provide an approved locomotive brake equipment embodying means for adjusting the rate of brake application to the different classes of service above enumerated.

A more specific object of the invention is to provide an approved locomotive brake equipment having means adjustable to provide a retarded rate of emergency brake application which is suitable for use in long freight trains, a faster rate of emergency brake application suitable for passenger trains and a combination of these rates for use in controlling trains of intermediate lengths such as express trains, so as to provide in all of these different classes of service for stopping of trains in emergency in the shortest distance possible without however causing damage to the trains due to the run-in or gathering of the slack.

These objects are obtained by the addition to a brake equipment of the type disclosed in the above mentioned Hewitt patent of a timing valve device and a three position cock suitably located for adjustment by the engineer on the locomotive. No modification of the devices in the brake equipment is necessary to realize the benefits of the invention and this is important since brake equipments embodying distributing valve devices substantially like that disclosed in the above referred to Hewitt patent are in service on locomotives.

Other objects and advantages will be apparent from the following more detailed description of the invention.

In the accompanying drawing the single figure is a diagrammatic view, partly in section and partly in outline, of a portion of a locomotive brake equipment embodying the invention.

As shown in the drawing the brake equipment comprises a distributing valve device 1, a delay valve device 2 associated with the distributing valve device, a brake cylinder device 5 adapted to be operated by fluid under pressure to apply the locomotive brakes and a suitable source of fluid under pressure such as a main reservoir 6, all of which parts may be identical to corresponding parts shown and fully described in the above referred to Hewitt patent.

The equipment further comprises in accordance with the invention a three-position cock 3 which is preferably adapted to be located in the cab of a locomotive for operation by the engineer, and a timing valve device 4.

For the purpose of simplicity in the present application and also due to the fact that reference may be had to the Hewitt patent above referred to only those parts of the distributing valve device 1 are shown in the drawing which are deemed essential to a clear understanding of the invention.

As shown, the distributing valve device comprises a pipe bracket 7 to which all pipe connections are made, and removably mounted on this pipe bracket are the delay valve device 2 and a control portion 8.

The control portion 8 of the distributing valve device embodies the usual equalizing portion controlled by brake pipe pressure and adapted to operate upon a reduction in brake pipe pressure to supply fluid under pressure from a pressure chamber 9 from which it is adapted to flow through a passage 10 to an application portion of the distributing valve device for effecting operation thereof to supply fluid at a corresponding pressure to the brake cylinder device 5 to apply the brakes on the locomotive.

The delay valve device 2 is provided for controlling communication between the passages 9 and 10 so as to provide for different rates of supply of fluid under pressure to passage 10 for operating the application portion of the distributing valve device to provide corresponding rates of application of the brakes on the locomotive.

The delay valve device 2 comprises a piston 12 and a slide valve 13 operatively connected to said piston for movement therewith. The slide valve is contained in a chamber 14 which is at all times supplied with fluid under pressure from the main reservoir 6 through a pipe 15 and a passage 16. At the opposite face of the piston there is a chamber 17 which is connected to a control pipe 18 leading to the cock 3 and which contains a spring 19 acting on the piston for urging same and thereby the slide valve 13 to the non-delay position shown.

The cock 3 is provided for either supplying fluid under pressure to the piston chamber 17 or for venting fluid under pressure therefrom as will be described in greater detail hereinafter.

When the piston chamber 17 is vented main reservoir pressure acting in valve chamber 14 is adapted to position the piston 12 and slide valve 13 as shown in the drawing against the opposing pressure of spring 19. This position is what may be termed a non-delay or a quick application position adapted to provide for an emergency application of brakes on passenger trains at a desired maximum rate to obtain as quick a stop as possible under an emergency condition. To obtain such a rapid application of brakes the slide valve 13 is provided with a cavity 22 which in the non-delay position of slide valve 13 establishes communication between passages 9 and 10 through which fluid under pressure is adapted to be supplied to the passage 10 and thereby to the application portion of the distributing valve device and thus to the brake cylinder device 5 at the same rate as supplied in emergency by the equalizing valve portion of the distributing valve device to the passage 9 whereby a maximum rate of brake application on the locomotive will be obtained.

When fluid under pressure is supplied to piston chamber 17 of the delay valve device and substantially equalizes with that in valve chamber 14, spring 19 is adapted to move the piston 12 and slide valve 13 to a lower or delay position which may be defined by engagement of said piston with stops 23 provided in the casing.

In this delay position of slide valve 13 the cavity 22 in slide valve 13 is moved out of registry with passage 10 thereby interrupting communication between said passage and passage 9 by way of said valve. These passages are however always connected by a communication 24 which is independent of the slide valve 13 and which contains a restricted portion in the form of a choke plug 25. Also in this position of slide valve 13 a cavity 60 therein connects passage 10 to a passage 61 which leads to the usual application chamber (not shown) of the distributing valve.

When, with the slide valve 13 in delay position, fluid under pressure is supplied by the equalizing portion of the distributing valve device to passage 9 in effecting an emergency application of brakes, the choke plug 25 is adapted to restrict the flow of fluid from passage 9 to passage 10 and thereby through passage 61 to the application chamber (not shown) to such a degree that the increase in pressure in passage 10 and thereby in the brake cylinder device 5 due to the usual operation of the application portion of the distributing valve device is so retarded as to permit the inertia of the locomotive to retard the gathering of slack in a long freight train so as to thereby avoid damage to the cars in the train which might occur if the brakes on the locomotive were applied at the same rate as in passenger service through cavity 22 by-passing choke 25, as above mentioned.

It will now be noted that the non-delay position of the piston 12 and slide valve 13, which is adapted to be employed when the locomotive is hauling a passenger train, provides for obtaining a maximum rate of emergency brake application on the locomotive, while in the delay position of said parts which is adapted to be used when the locomotive is controlling a freight train, the application of brakes on the locomotive will be retarded so as to avoid harsh running-in of the train slack and possible damage to the cars of the train.

This functioning of the delay valve device 2 as just described is identical to that of the corresponding device disclosed and described in the Hewitt patent above mentioned.

According to the invention the cock 3, which constitutes a selector or changeover device adjustable by the engineer in accordance with the class of service in which the locomotive is being used is provided for controlling the pressure of fluid in piston chamber 17 of the delay valve device. The cock 3, comprises a casing 30 containing a plug valve 31 which is rotatable in said casing by a manually operable handle 32 to either one of three positions indicated on the drawing by the legends Passenger service, Freight service, and Express service.

In the drawing the handle 32 and thereby the plug valve 31 are shown in the positions which they are adapted to occupy when the locomotive is connected to a passenger train for controlling same. In this position a cavity 33 in the plug valve establishes communication between pipe 18 and an atmospheric port 34 whereby piston chamber 17 in the delay valve device 2 is vented to the atmosphere so that the delay valve piston 12 and slide valve 13 will occupy the non-delay position shown in the drawing to provide for effecting an emergency application of brakes on the passenger train at a desired maximum rate, as above mentioned.

If the locomotive provided with this equipment is coupled to a long freight train it is intended that the engineer shall operate the handle 32 from the Passenger service position shown to the Freight service position and thereby turn the plug valve 31 to a position in which the pipe 18 is connected by way of the cavity 33, a port 35 and cavity 36 in said valve to a pipe 37 which in Freight service position is supplied with fluid under pressure from the main reservoir 6 through a pipe 38 and the timing valve device 4, which will be later described. Thus in the Freight service position piston chamber 17 in the delay valve device 2 will be charged with fluid under pressure whereupon spring 19 will act to hold the piston 12 and the slide valve 13 in their lower or delay positions above mentioned and in which the rate of brake application will be controlled by the choke plug 25 and thus retarded to insure a gentle gathering of the slack in the freight train.

If the locomotive provided with this equipment is connected to control a train which is shorter than the usual freight train but longer than a passenger train, such for instance as an express train then it is intended that the engineer move the handle 32 to the Express service position. In this position of handle 32 the plug valve 31 is adapted to be positioned so that pipes 18 and 37 will be connected the same as in Freight service position and in addition, a port 39 in the plug valve 31 is so arranged as to connect a pipe 40 which is open to the brake cylinder device 5 to a pipe 41 which leads to the timing valve device 4.

The timing valve device 4 comprises a piston 43 having at one side a chamber 44 open to pipe 41 and at the opposite face a chamber 45 which is normally open to the atmosphere through a vent port 46. The piston 43 is arranged to control a pair of oppositely seating poppet valves 47 and 48 which are contained in a chamber 49 communicating with pipe 37. The valve 47 is provided for controlling communication between chamber 49 and a chamber 50 which is constantly supplied with fluid under pressure from reservoir 6 through a pipe 38. The valve 48 is provided for controlling communication between chamber 49 and a chamber 51 which is open to the atmospheric vent port 46. The piston 43 is operatively connected to the valve 48 by a resilient telescopic connection 52

When fluid under pressure is supplied to piston chamber 44 the piston 43 is adapted to operate through the connection 52 to unseat the valve 48 and to seat the valve 47. A spring 53 in chamber 45 acting on piston 43 is adapted to move said piston to the position shown when the piston chamber 44 is vented under which condition a spring 54 acting on valve 47 is adapted to unseat same and to seat the valve 48.

With plug valve 31 of cock 3 in either the Passenger service or Freight service position there is no fluid supplied to piston chamber 44 in the timing valve device as will be apparent from the drawing, under which condition the valve 48 will be seated and the valve 47 unseated. This conditioning of the valves 47 and 48 is immaterial in passenger service but in freight service the valve 47 being unseated is adapted to permit the supply of fluid from the main reservoir pipe 38 to pipe 37 for conditioning the delay valve piston 12 and slide valve 13 to retard the application of locomotive brakes, as above described.

At the time an application of brakes is initiated on the locomotive when handle 32 of the cock 33 is in the Express service position, the delay valve device 2 will be in the delay position so that the application of brakes on the locomotive will be retarded as above described. It is intended that in express service the application of brakes on the locomotive be thus retarded only for a time sufficient for the gentle gathering of slack and then be increased to the rate provided for passenger service. The timing valve device 4 is provided to effect this increase in the rate of brake application, as will now be described.

As above mentioned, piston chamber 44 in the timing valve device is connected through pipe 40 to the brake cylinder device 5 when cock 3 is in Express service position and is thus supplied with fluid at the same pressure as supplied to the brake cylinder device 5 by operation of the distributing valve device 1 in effecting an application of the locomotive brakes. When the pressure of fluid in the brake cylinder device 5 and in piston chamber 44 of the timing valve device is thus increased to a degree which will overcome the opposing pressure of spring 53 on the timing valve piston 43, said piston will move in an upwardly direction against said spring and unseat valve 48 and seat the valve 47.

This seating of valve 47 cuts off the supply of fluid under pressure to the delay valve piston chamber 17, while the unseating of valve 48 vents said chamber to chamber 51 and thence to the atmosphere through the vent port 46. The venting of fluid under pressure from the delay valve piston chamber 17 permits main reservoir pressure acting in valve chamber 14 to move the piston 12 and thereby the slide valve 13 to their upper or non-delay position whereby the rate at which the further application of brakes on the locomotive is effected corresponds to that provided for the control of passenger trains.

It will therefore be apparent that when the engine is controlling a train such as an express train with the cock handle 32 in Express service position the delay valve device 2 will act to initially retard the application of brakes on the locomotive to the same degree as in freight service but only for a period of time sufficient to cause gentle gathering of the slack in the train after which said device will operate automatically under the control of the timing valve device 4 to increase the rate of brake application to that employed for passenger trains to thereby insure stopping of the express train in the shortest possible distance, avoiding however the possibility of damage due to the run-in of slack.

It will now be apparent that with the proper adjustment of cock 3 a locomotive and train controlled thereby may be brought to a stop in case of an emergency application of brakes in the shortest possible distance without danger of causing damage to the train due to the run-in of slack. In passenger service where train slack is not of great importance the improved arrangement provides for an emergency application of brakes being effected at a desired maximum rate, while in freight service where the control of slack is of major importance to avoid damage to the train, the improved apparatus provides for retarding the application of brakes on the locomotive to so control the slack in the train as to prevent damage to the train. With the cock 3 in the Express service position employed when the locomotive is controlling an express train the improved apparatus operates automatically to initially retard the application of brakes on the locomotive until the slack in the train has been gathered and to then increase the rate of brake application on the locomotive to that employed in passenger service so as to thereby obtain a stop as quickly as possible but at the same time preventing damage to the train due to run-in of train slack.

While one illustrative embodiment of the invention has been described in detail, it is not the intention to limit the scope to that embodiment or otherwise than by the terms of the appended claims.

Having now described my invention, what I claim as new and desire to secure by Letters Patent, is:

1. In a locomotive fluid pressure brake equipment, in combination, brake applying means operable to effect an application of brakes, delay valves means for controlling the rate at which the application of brakes is effected by said brake applying means and conditionable to provide either one rate of brake application or a different rate of brake application, selector means having three positions and being movable to either one of two positions to condition said delay valve means to provide said one rate of brake application or to a third position to condition said delay valve device to provide said different rate of brake application, and means conditionable by said selector means in one of said two positions to operate automatically a certain time interval after initiation of said one rate of brake application to condition said delay valve means to provide said different rate of brake application.

2. In a locomotive fluid pressure brake equipment, in combination, brake applying means operable to effect an application of brakes, delay valve means for controlling the rate at which the application of brakes is effected by said brake applying means and conditionable to provide either one rate of brake application or a different rate of brake application, selector means having three positions and being movable to either one of two positions to condition said delay valve means to provide said one rate of braking application or to a third position to condition said delay valve means to provide said different rate of brake applications, and means operable in one of said two positions upon a chosen increase in the degree of brake application effected by said brake applying means to condition said delay valve means to provide said different rate of brake application.

3. In a fluid pressure brake equipment, in combination, brake applying means operable by fluid under pressure to effect an application of brakes to a degree dependent upon the pressure of the actuating fluid, delay valve means for controlling the rate at which fluid pressure is supplied to said brake applying means and conditionable to provide either one rate or a different rate of brake application, selector means movable to either one of two positions to condition said delay valve means to provide said one rate of fluid pressure supply or to a third position to condition said delay valve means to provide said different rate, and means operable automatically in one of said two positions of said selector means upon a chosen increase in pressure on said brake applying means to condition said delay valve means to provide said different rate of supply.

4. In a fluid pressure brake equipment, in combination, delay valve means for controlling the rate at which an application of brakes is effected and movable to a non-delay position to provide for a relatively fast flow of fluid under pressure to effect a relatively quick application of brakes and to a delay position to provide a relatively slow rate of flow of fluid under pressure to effect a relatively slow application of brakes, brake applying means operable to effect an application of brakes at a rate dependent upon the position of said delay valve means, selector means for controlling said delay valve means and having two positions for effecting movement of said delay valve means to said delay position and a third position for effecting movement of said delay valve means to said non-delay position, and means conditioned in one of said two positions to operate upon a chosen increase in the pressure of fluid supplied through said delay valve means for effecting operation of said brake applying means, to effect movement of said delay valve means to said non-delay position.

5. In a fluid pressure brake equipment, in combination, a delay valve device having one position for providing one rate of brake application and another position to provide a slower rate of brake application, control means for controlling the position of said delay valve means and being movable to either one of two positions to condition said delay valve means to provide said slower rate of brake application and being movable to a third position to condition said delay valve means to provide said faster rate of brake application, and means conditionable to operate in one of said two positions upon a chosen initial increase in the degree of brake application to effect operation of said delay valve means to provide said faster rate of brake application.

6. In a locomotive fluid pressure brake equipment, in combination, valve means having a passage to which fluid under pressure is adapted to be supplied for effecting an application of brakes at a rate corresponding to the rate of supply of fluid under pressure to said passage, delay valve means for controlling the rate of supply of fluid under pressure to said passage and having a delay position for providing a relatively slow rate of supply and a non-delay position for providing a faster rate of supply, a selector valve device movable to either one or another of two positions for positioning said delay valve means in said delay position and to a third position for positioning said delay valve means in said non-delay position, and means conditionable in one of said two positions to operate automatically upon a chosen increase in pressure in said passage for effecting movement of said delay valve means to said non-delay position.

7. In a locomotive fluid pressure brake equipment, in combination, a valve device having a passage to which fluid under pressure is adapted to be supplied at different rates for effecting an application of brakes, brake applying means operable upon supply of fluid under pressure to said passage to effect an application of brakes at a rate and to a degree depending upon the rate and pressure of fluid supplied to said passage, delay valve means for controlling the supply of fluid under pressure to said passage and having a delay position to provide a relatively slow flow of fluid under pressure to said passage and a non-delay position to provide for a faster rate of flow of fluid under pressure to said passage, selector valve means movable to either one or another of two positions for positioning said delay valve means in said delay position and movable to a third position for positioning said delay valve means in said non-delay position, and means conditionable in one of said two positions to operate upon a chosen degree of brake application effected by operation of said brake applying means to effect movement of said delay valve means to said non-delay position.

8. In a locomotive fluid pressure brake equipment, in combination, a valve device having a passage to which fluid under pressure is adapted to be supplied for effecting an application of brakes, brake applying means operable upon supply of fluid under pressure to said passage to effect an application of brakes to a degree and at a rate dependent respectively upon the degree of pressure of fluid supplied to said passage and the rate of such supply, delay valve means having one position to provide for a relatively slow rate of supply of fluid under pressure to said passage and operable upon a predetermined variation in fluid pressure in a chamber to another position to provide for a faster rate of supply of fluid under pressure to said passage, selector valve means movable manually to either one of three positions and operable in two of said positions to effect a variation in fluid pressure in said chamber for conditioning said delay valve means to provide said relatively slow supply of fluid under pressure to said passage and operable in said third position to effect a variation in fluid pressure in said chamber to condition said delay valve means for effecting said faster rate of supply of fluid under pressure to said passage, and timing means operative upon a chosen increase in the pressure of fluid supplied to said passage for conditioning said delay valve means to provide said faster rate of brake application, said selector valve means being operable in only one of said two positions to render said timing means operable in accordance with the pressure of fluid supplied to said passage.

9. In a locomotive fluid pressure brake equipment, in combination, brake applying means operable by fluid under pressure to effect an application of brakes at a rate dependent upon the rate of supply of fluid thereto and to a degree dependent upon the degree of pressure of such fluid, a valve device having a passage to which fluid under pressure is adapted to be supplied to effect a corresponding variation in fluid pressure on said brake applying means, a delay valve device having a delay position to provide for a relatively slow rate of supply of fluid under pressure to said passage and a non-delay position to provide for a faster rate of supply of fluid under pressure to said passage, said delay valve device being controlled by variations in fluid pressure in a chamber and being operable to said delay position upon an increase in pressure in said chamber and to said non-delay position upon the venting of fluid under pressure from said chamber, a manually operable selector cock movable to either one of three positions and operable in two of said positions to supply fluid under pressure to said chamber and in the third position to vent fluid under pressure from said chamber, valve means controlling the supply of fluid under pressure to said chamber through said selector cock and operable to cut off such supply and to vent fluid under pressure from said chamber, means adapted to operate upon a predetermined increase in fluid pressure to effect operation of said valve means to vent fluid under pressure from said chamber, said selector cock in one of said two positions connecting said means to said brake applying means for rendering said means responsive to the pressure of fluid operating said brake applying means, and means operable in the other of said two positions and in said third position of said selector cock for maintaining said means in condition providing for the supply of fluid under pressure past the said valve means to said selector cock.

10. In a locomotive fluid pressure brake equipment, in combination, brake applying means operable by fluid under pressure to effect an application of brakes at a rate and to a degree dependent upon the rate of supply of fluid under pressure to a passage and the degree of pressure of such fluid, manually operable means for controlling the rate at which fluid is supplied to said passage and having one position to provide a relatively fast rate of supply, and two positions to provide a relatively slow rate of supply, and means conditioned by said manually operable means in one of said two positions to operate automatically upon a chosen increase in the degree of brake application to increase the rate of supply of fluid under pressure to said passage, said means being inoperative in the other of said two positions to increase the rate of supply of fluid under pressure to said passage.

CLYDE C. FARMER.